UNITED STATES PATENT OFFICE.

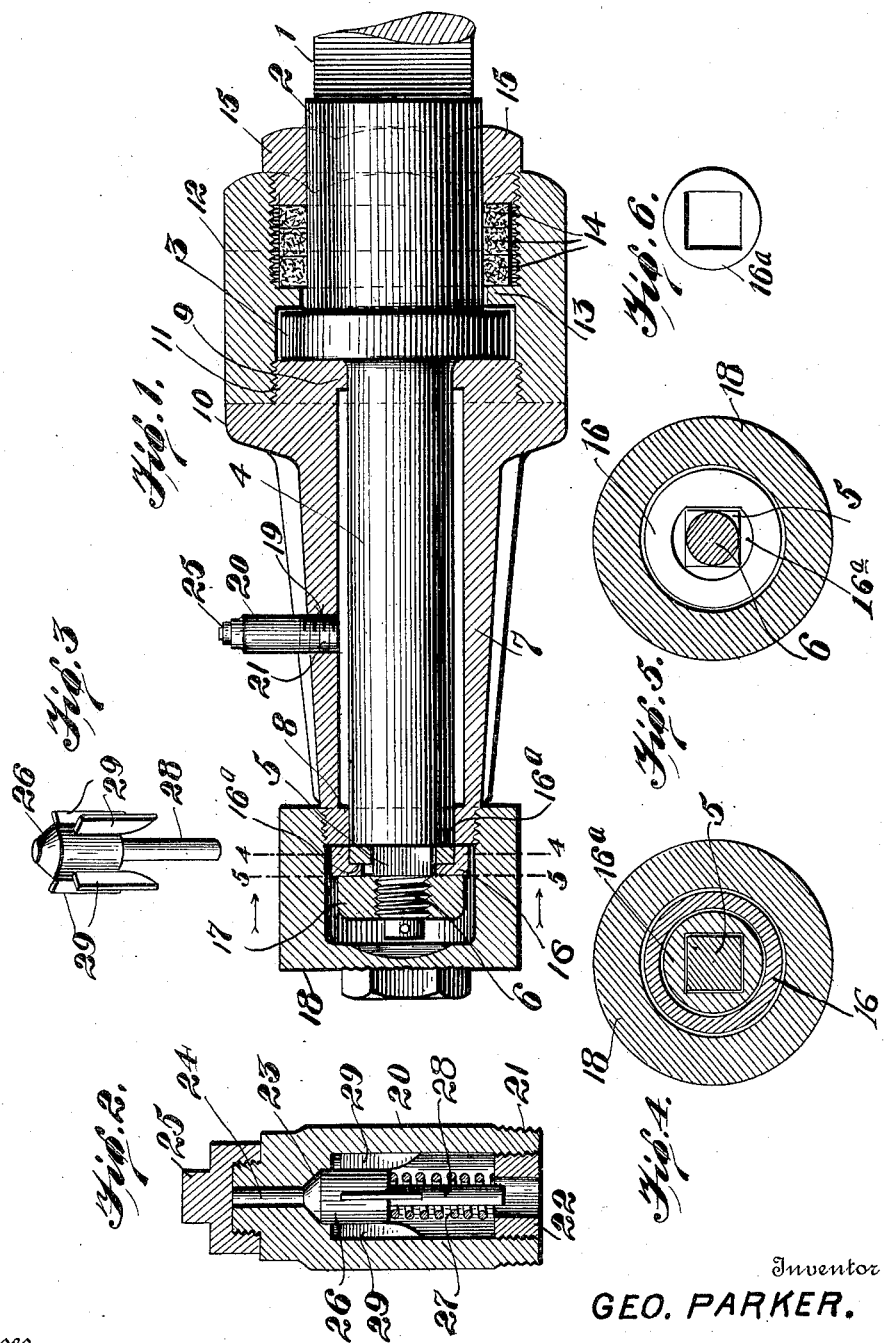

GEORGE PARKER, OF PORTSMOUTH, VIRGINIA, ASSIGNOR OF FIFTY ONE-HUNDREDTHS TO ABE LEVITIN, OF PORTSMOUTH, VIRGINIA.

AXLE-BOX.

1,032,235.

Specification of Letters Patent.

Patented July 9, 1912.

Application filed March 19, 1910. Serial No. 550,367.

*To all whom it may concern:*

Be it known that I, GEORGE PARKER, a citizen of the United States of America, residing at Portsmouth, in the county of Norfolk and State of Virginia, have invented certain new and useful Improvements in Axle-Boxes, of which the following is a specification, reference being had therein to the accompanying drawing.

This invention relates to axle boxes, and the principal object of the same is to provide an axle box that will be dust-proof and which may be readily removed from the axle spindle, said box being provided with means for retaining lubricating material therein and also with novel means for permitting lubricating material to be poured therein without the necessity of the box being removed from the spindle.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a central vertical sectional view, showing the improved box fitted over a spindle. Fig. 2 is a similar view of a valve chamber and valve through which lubricating material is fed to the interior of the box. Fig. 3 is a detail perspective view of the controlling valve. Fig. 4 is a vertical transverse sectional view taken on the line 4—4, Fig. 1. Fig. 5 is a similar view taken on the line 5—5, Fig 1. Fig. 6 is a detail view of a washer for the axle spindle.

Referring to said drawings by numerals, 1 designates an axle provided with the cylindrical shoulder 2 the outer end of which terminates in an annular flange 3 from which the spindle 4 projects, said spindle having a reduced square extension 5 at its outer portion the free end of which is provided with threads 6.

An axle box 7 surrounds the spindle 4 in spaced relation, said box having an inwardly projecting annular flange 8 at its outer end that rests on the spindle 4 and a similar flange 9 at its inner end that also rests on spindle 4. The inner end of box 7 is also provided with an outstanding annular flange 10 from which an externally threaded tubular shoulder 11 projects. The inner end of box 7 abuts spindle flange 3 and the threaded shoulder 11 of said end is engaged by the internally threaded end of a sleeve 12 that incloses flange 3 and is provided with an inwardly projecting annular flange 13 that projects parallel with the inner surface of flange 3. Flange 13 forms an abutment for the packing rings 14 which surround the shoulder 2 of axle 1 and which are tightened by the gland 15 that has a threaded engagement with sleeve 12. The sleeve 12 and gland 15 obviously provide a stuffing box in which the compression of the packing rings 14 is regulated by adjusting gland 15.

A washer 16ᵃ is fitted over the squared extension of spindle 4, said washer being inclosed by a flanged washer 16 and said washers are inclosed and clamped to the outer end of spindle 4 and box 7 by the nut 17 that engages the threaded portion 6 of said extension. A cap nut 18 incloses the extension of spindle 4 and has an internally threaded portion that is adapted for engagement with the externally threaded outer end of box 7. Cap nut 18 obviously provides a lubricating chamber for the outer end of the axle box.

Box 7 is provided with an intermediate threaded opening 19 that communicates with the lubricating space between the box and the spindle. A valve chamber 20 has a threaded end 21 for engagement with said opening 19. The box-engaging end of chamber 20 is also internally threaded for the reception of a collar 22. Internally, the other end portion of chamber 20 is provided with a valve seat 23 from which the passage 24 projects to the outer end of said chamber. Said outer end is reduced and externally threaded for the reception of a sealing cap 25. A valve 26 is normally held to seat 23 by the tension of a spring 27 that is coiled about valve stem 28, one end of said spring bearing against said valve and the other end being seated on collar 22. Wings 29 project from valve 26 and contact with the inner surface of chamber 20 to guide valve 26 in its movements in said chamber.

To feed lubricating material to box 7 cap 25 is removed from the outer end of valve chamber 20, and the spout of a lubricating can forced through passage 24 to remove valve 26 from its seat against the tension of spring 27, so that the lubricating material may be forced through chamber 20 to the axle box. Valve chamber 20 projects through the usual hub that is fitted on the axle box, so that the lubricating material may be applied without removing the wheel.

What I claim as my invention is:—

An axle, a spindle at the end of said axle, an annular flange at the inner end of said spindle, a sleeve mounted upon said axle and overlapping said spindle, said sleeve being provided with an internal annular flange abutting against the inner face of said first mentioned flange, packing between said sleeve and axle, a compressing ring for said packing, and a box mounted upon said spindle and contacting with said first mentioned flange and removably connected with said sleeve.

In testimony whereof I hereunto affix my signature in presence of two witnesses.

GEORGE PARKER.

Witnesses:
ABE LEVITIN,
J. W. PENNINGTON.

Copies of this patent may be obtained for five cents each, by addressing the "Commissioner of Patents, Washington, D. C."